April 22, 1941.  F. J. LAPOINTE  2,239,237
BROACHING MACHINE
Filed Oct. 19, 1937  4 Sheets-Sheet 2

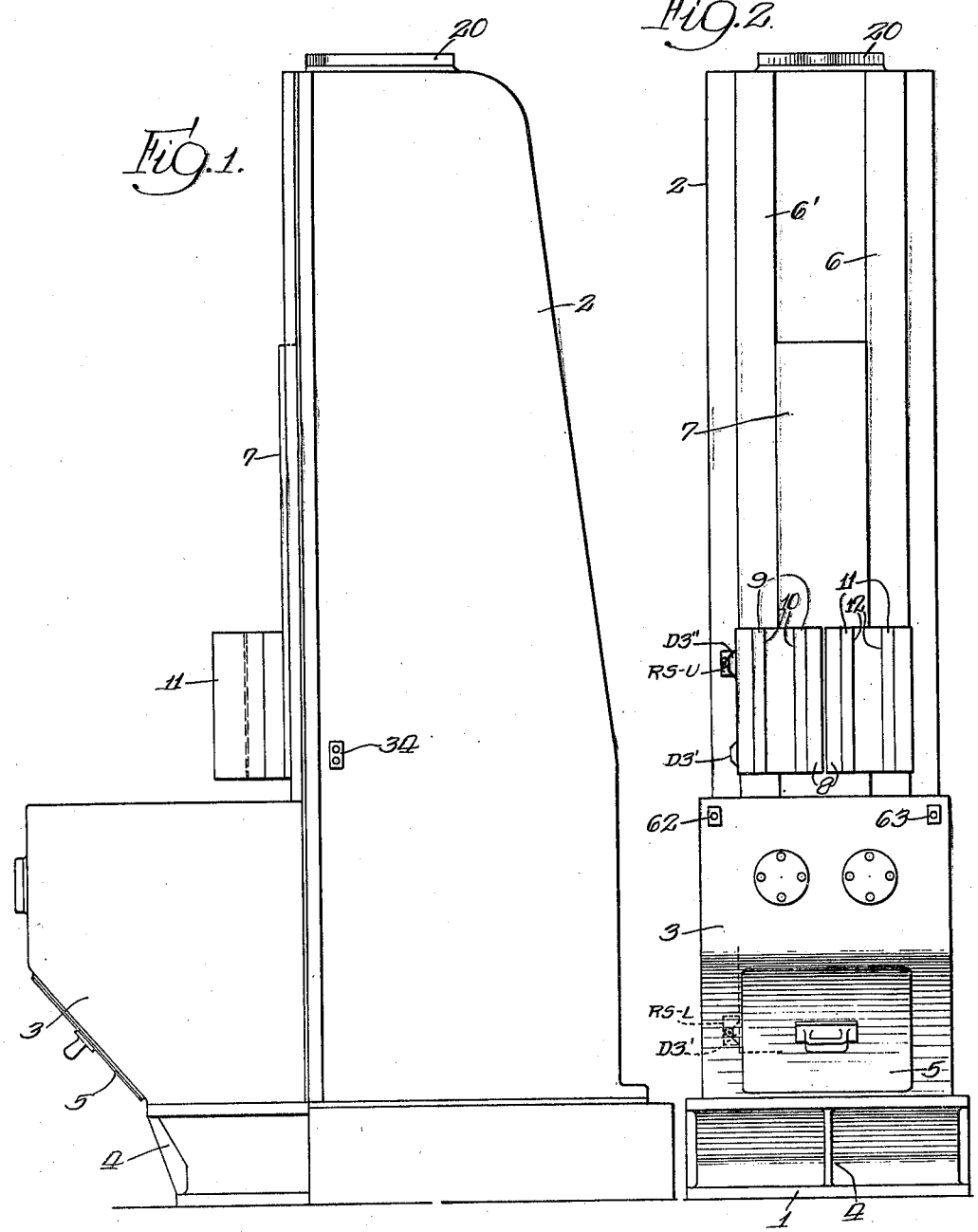

Inventor:-
Francis J. Lapointe

April 22, 1941.  F. J. LAPOINTE  2,239,237
BROACHING MACHINE
Filed Oct. 19, 1937  4 Sheets-Sheet 3
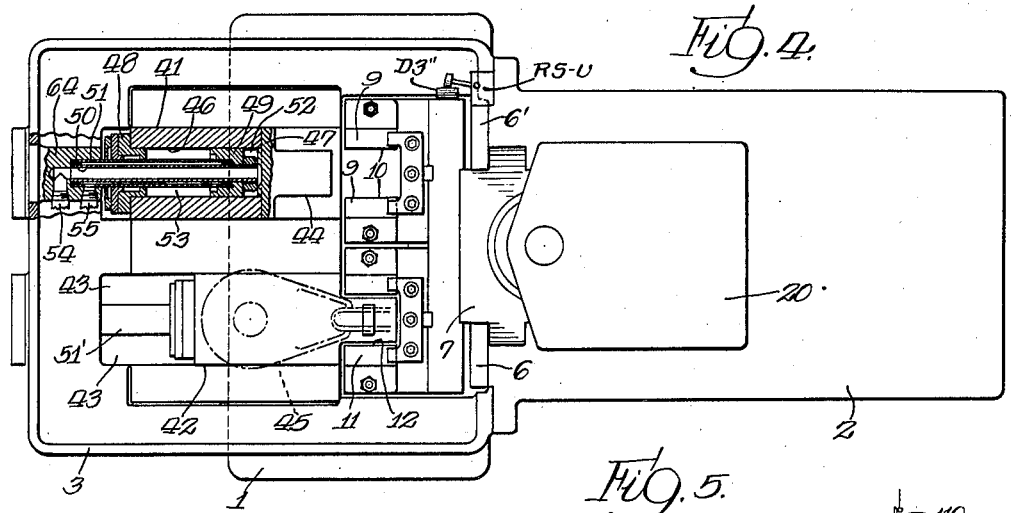
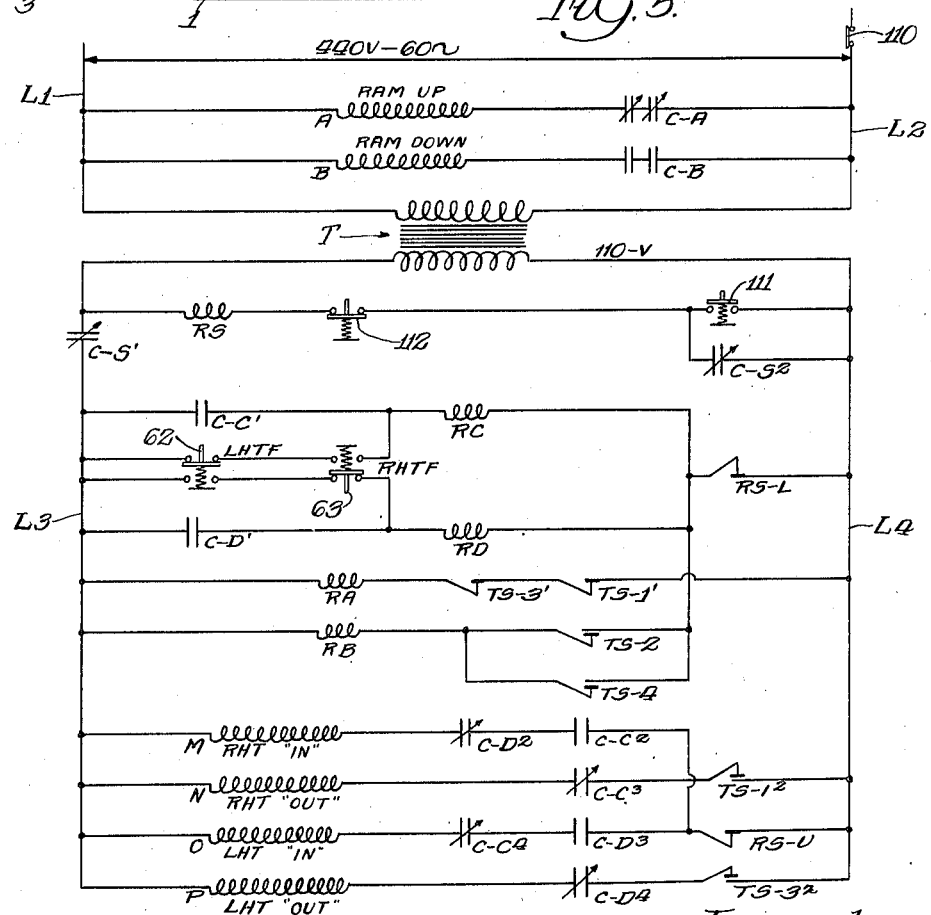
Inventor:—
Francis J. Lapointe,

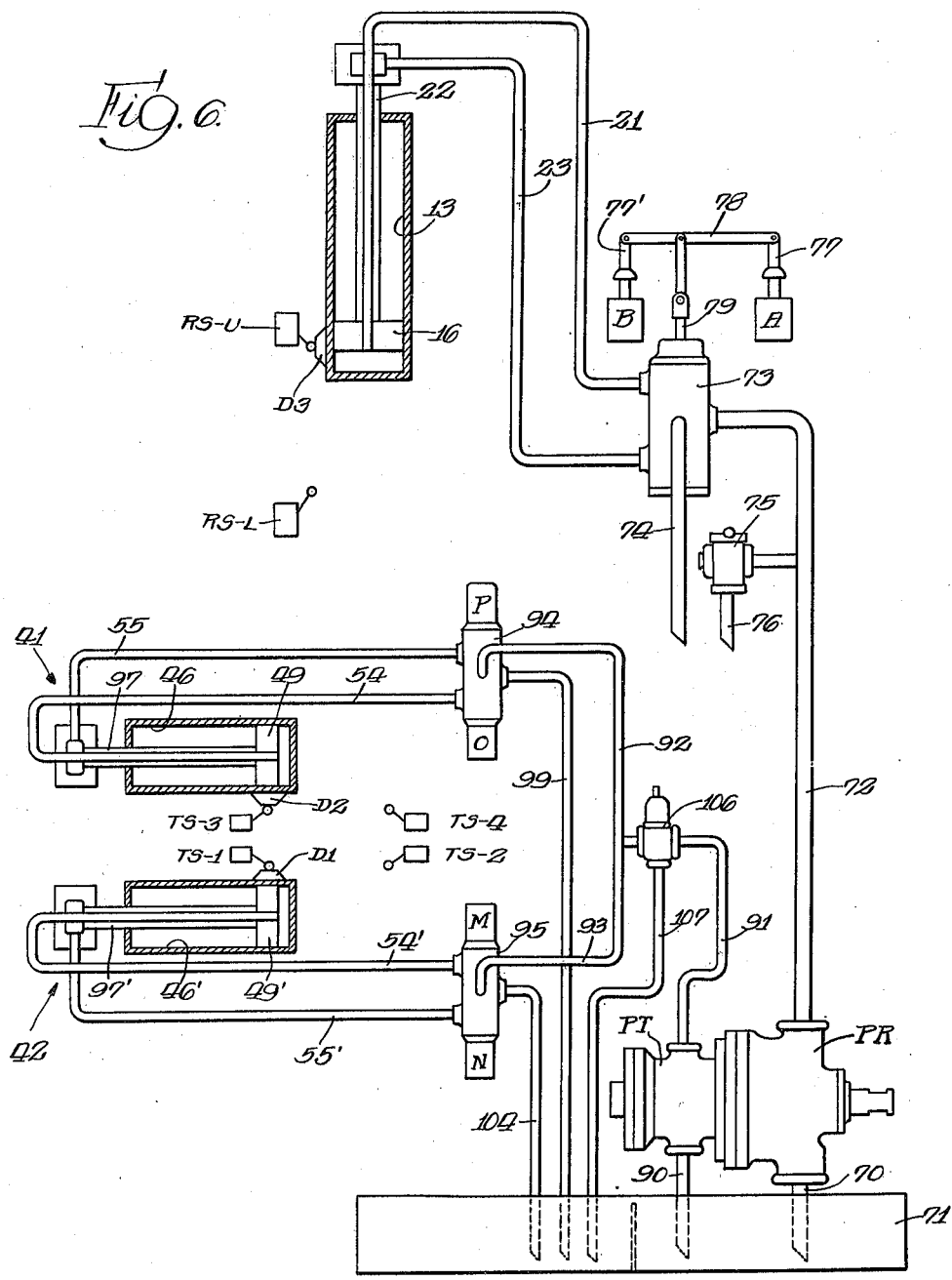

Patented Apr. 22, 1941

2,239,237

UNITED STATES PATENT OFFICE 2,239,237

BROACHING MACHINE

Francis J. Lapointe, Ann Arbor, Mich., assignor, by mesne assignments, to American Broach & Machine Co., Ann Arbor, Mich., a corporation of Michigan Application October 19, 1937, Serial No. 169,848

20 Claims. (Cl. 90—33)

My invention relates to broaching machines, more particularly broaching machines of the single ram type, and has as a general object to provide a new and improved broaching machine of that character.

A more particular object of my invention is to provide a broaching machine of the single ram type having a new and improved construction and a new mode of operation materially enhancing the production of a machine of that type.

Another object is to provide in a broaching machine of the single ram type a plurality of work supporting tables so operable that one table may be loaded while a broaching operation is performed on the work piece of the other table, to eliminate the time lost by having the ram idle during the loading of a table.

Yet another object is the provision of a single ram broaching machine constructed so that the ram carries several broaches and having a plurality of work tables each cooperable with one of the broaches and shiftable into broaching position during alternate broaching strokes of the ram.

Still another object is to provide a semiautomatic broaching machine having a single ram carrying a plurality of broaches, a plurality of work supporting tables each cooperable with one of the broaches during alternate broaching strokes, and automatic control means governing the operation of a table and the ram upon manual initiation of movement of the table from its loading to its broaching position.

A further object of my invention is the provision of a broaching machine having a single broach supporting ram cooperable with a pair of work supporting tables which are controlled independently of one another, in such a manner that one table may be advanced to a broaching position whereupon a mechanism, actuated automatically, causes the broaching ram to advance through a broaching stroke and the work supporting table to return to its initial position, which in turn causes the automatic return of the broaching ram to an initial position, all of these actions being designed to take place before operation of the alternate work supporting table which has meanwhile been retained in a position for loading with a work piece.

A still further object of my invention is the provision of a multiple electrically controlled and hydraulically actuated broaching machine featuring two distinct hydraulic circuits, one for the broaching ram and one for the work supporting tables, and further featuring a primary electric circuit coupled with a secondary electric circuit, cooperable respectively with the two hydraulic circuits in such a manner that the action of the elements in one circuit causes activity in the operation of the other in accordance with a predetermined sequence of operation.

Further objects and advantages will appear as the description proceeds taken in connection with the accompanying drawings, which form a part of this application, in which:

Fig. 1 is a side elevation of a broaching machine embodying the features of the invention.

Fig. 2 is a front elevation of the machine shown in Fig. 1.

Fig. 4 is a top view of the machine shown partly in section.

Fig. 5 is a diagram of the electric control circuit of the machine.

Fig. 6 is a diagram of the hydraulic circuit of the machine.

Figure 3:
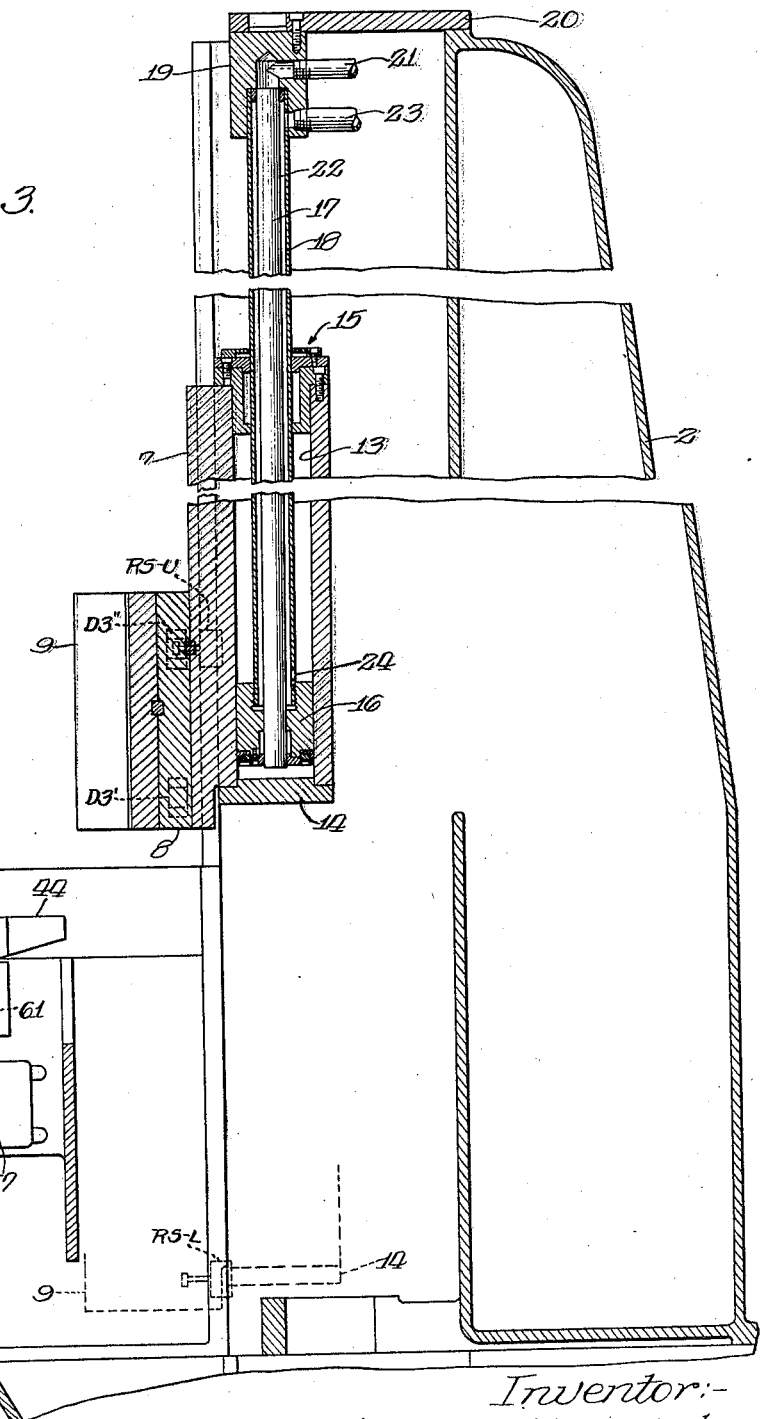
Fig. 3 is a partial longitudinal section through the broaching machine.

While I have shown in the drawings and will herein describe in detail the preferred embodiment of my invention, it is to be understood that I do not thereby intend to limit the invention to the specific form disclosed, but aim to cover all modifications and alternative constructions falling within the spirit and scope of the invention as expressed in the appended claims.

In the operation of broaching machines, the manual adjustments necessary to properly load a work piece upon a work table in a manner such that it will resist the disturbing forces set up during a broaching operation involve appreciable time. The length of time necessary to load the machine for each broaching stroke is such that the activity of the broaching ram, under such circumstances, is reduced to the point where the ram is idle a large part of the time. To eliminate this idle and nonproductive time in a machine of economical construction, the broaching machine described herein has been perfected. This machine has but a single broach-carrying ram and a plurality of work supporting tables independently operable but in timed relation with the operation of the ram. In a broaching machine of such a description, there is ample time for loading an idle work supporting table while an operative work supporting table is advanced to broaching position, the ram driven through a broaching stroke, the table retracted to its initial loading position, and the ram returned to its initial starting position.

A vertical broaching machine has been chosen to illustrate the preferred embodiment of the invention and is shown herein as having a vertically reciprocable ram equipped in this instance with two sets of broach supports, each capable of supporting a pair of parallel surface broaches. The broaches are secured in the supports with the broaching surfaces face to face. Positioned on the machine in front of the ram are a pair of work supporting tables which reciprocate alternately in a horizontal plane. Each of the work tables has a narrow protruding portion which may enter the space between the parallel surface broaches and carry with it a work piece of particular shape. The ram and the tables herein are hydraulically actuated under a semiautomatic electrical control means.

In a position at rest, the broaching ram is retracted to an uppermost initial or starting position and the work supporting tables are retracted outwards to their initial or loading positions remote from the plane of operation of the broaching ram. The work supporting tables can be operated only one at a time with a cycle of operation initiated by a manually controlled push button switch. When one of the tables has been loaded with a work piece, inward movement to a broaching position is initiated by manual actuation of its push button. As an incident to its inward movement, the table through the automatic actuation of a switching device, causes the broaching ram to advance through a broaching stroke, which actuation does not occur, however, until the table reaches its proper position. At the completion of a broaching stroke, the ram actuates another automatic mechanism which effects retraction of the operative work supporting table to its initial or loading position and, immediately upon the table arriving at its initial position, still another automatic means is actuated which serves to retract the broaching ram upward to the initial position thereof.

Meanwhile the inactive work supporting table has been withheld for the purpose of loading it with a work piece. To insure safety in operation, there is no automatic advance operative on the inactive table while at rest. After the other operating members of the machine have reached their initial positions, the previously inactive work supporting table can be started inward to a broaching position only by the manual manipulation of its push button switch, whereupon the broaching cycle proceeds in a manner similar to that described for the first mentioned table. The hydraulic and electric circuits together with the sequence of operation thereof will be described in greater detail as the description proceeds.

Referring now more particularly to the drawings, Figs. 1 to 4 thereof show a vertical hydraulic broaching machine having a base 1 supporting a vertical frame or column 2 which has at the front a bracket 3, frequently cast integral with the frame, and supported in part by a forward extending portion 4 of the base 1. A removable panel 5 is provided to give access to the space within the bracket.

Slidably mounted upon ways 6 on the front face of the vertical column 2 is a hydraulic ram 7 which carries a broach supporting means provided in the embodiment shown with sets of vertical surface broach supports 8, 8. The broaches supported thereon are arranged in pairs so that broaches 9, 9 on the left of Fig. 2 are positioned parallel with respect to each other having their cutting surfaces 10, 10 face to face. On the right hand side parallel broaches 11, 11 are positioned so that the cutting surfaces 12, 12 are face to face. The broaches are all securely mounted upon the ram 7 which includes a movable ram cylinder 13 at the rear thereof (see Fig. 3). In the embodiment shown, the cylinder is closed at the bottom by a plug 14 and at the top by a mechanical seal generally designated 15. A stationary piston 16 is positioned within the cylinder to form therewith the ram motor and is connected by a rod 17 and an annular sleeve 18 to an anchor block 19 attached to the plate 20 which forms a top for the frame. The piston rod 17 is hollow and forms a passage for admitting and exhausting fluid through a pipe 21 to and from the head end of the cylinder 13, while sleeve 18 forms with the rod 17 an annular passage 22 for similarly admitting and exhausting fluid to and from the rod end of the cylinder through a pipe 23. The sleeve 18 communicates with the rod end of the cylinder through a series of apertures 24.

For carrying the work to and away from a broaching position, a pair of work supporting tables 40 are provided. These tables comprise in the main reciprocating cylindrical members 41 and 42 which are supported upon slides 43 built upon the bracket 3 and provide a flat work supporting surface on the top. At the end adjacent the ram each table has a projecting portion 44 and is designed as a whole to support a work piece which may be of the character of the article 45 represented by the dot and dash lines upon the right hand work supporting table in Fig. 4. The article shown is of such character that the end thereof extends over and is supported by the projecting portion 44 of the work table which may be inserted between the faces of a pair of the parallel broaches so that each of the side faces at the end of the article may be broached in parallel planes at a single stroke of the broaching ram.

The structural characteristics of each of the work tables are essentially the same, that for the left hand table being shown in section on the upper side of Fig. 4. As previously noted, the table in large part is composed of a cylindrical member forming a cylinder 46 having a plugged end 47 and a packing 48 at the other end for slidably admitting a piston rod. Within the cylinder is located a stationary piston 49 which in turn is secured to a boss 64 at the front part of the frame by means of a hollow piston rod 50 surrounded by an annular sleeve 51 and together forming passages whereby fluid can be admitted to or extracted from the head end 52 or the rod end 53 of the cylinder 46, the fluid being conducted respectively through pipes 54 and 55 in a more or less conventional manner similar to that described for the broaching ram in this embodiment.

In order that the hydraulic operation may be properly and more readily understood, a diagram showing the ram cylinder and the table cylinders, together with the requisite valves and pumps, is shown in Fig. 6. In the diagram, the ram cylinder 13 is shown retracted upward to its initial or starting position with the piston 16 forced to the end of the cylinder. A high pressure ram pump PR driven by suitable means, such as an electric motor (not shown), is shown at the lower right hand portion of the diagram connected by means of a pipe 70 leading to a point beneath the surface of a body of hydraulic fluid in a tank or reservoir 71. A pressure line 72 leads from the pump to a four-way valve 73 from which the hydraulic fluid is conducted alternately through the pipes 21 and 23 to either the head or the rod end of the ram cylinder. As diagrammed, the pipe 21 leads downward through the piston 16 in order to communicate with the head end of the cylinder, while the pipe 23 communicates with the annular passage 22 which conducts fluid to and from the rod end of the ram cylinder. Fluid returned to the valve 73 from the cylinder 13 is discharged to the reservoir 71 through an exhaust line 74. When, for example, the four-way valve is set so that hydraulic fluid from the pump is being directed through the pipe 21 to the head end of the ram cylinder, the fluid already occupying the space within the rod end of the ram cylinder is expelled outward through the pipe 23 and thence through the four-way valve to the exhaust line 74 which conducts the fluid back to the reservoir. Also located in the high pressure line 72 leading directly from the pump is a pressure relief valve 75 which can be set for a desired high pressure and which actuates to discharge fluid through a return line 76 to the reservoir 71 when the high pressure exceeds the amount for which the valve is set.

Since the broaching machine is electrically controlled, the four-way valve 73, in the present instance, is actuated to pass fluid in one direction or another by means of solenoids A and B connected by a system of levers 77, 77' and 78 to a valve stem 79 of the valve 73. Energization of the solenoid A, which may be termed the "ram-up" solenoid, shifts the valve 73 to direct fluid to the rod end of the cylinder 13, thus raising the ram. Energization of the solenoid B, which may be termed the "ram-down" solenoid, produces the opposite effect.

A second independent hydraulic circuit supplies the work table cylinders 46 and 46' which serve to reciprocate the work supporting tables 41 and 42 respectively. The second hydraulic circuit is supplied with fluid under pressure by a table circuit pump PT which, in the embodiment shown, is secured to the casing of the ram pump PR and is driven simultaneously with the ram pump by the same drive shaft.

The table circuit pump is connected by means of a pipe 90 with the body of fluid in the reservoir 71 and discharges fluid through a primary pressure line 91 and lines 92 and 93 which lead to four-way valves 94 and 95 controlling the left hand and right hand tables respectively. From the valve 94 a pipe 54 conducts fluid through the piston 49 to and from the head end of the table cylinder 46, and a pipe 55 conducts fluid through an annular passage 97, formed by the piston rod and sleeve, to and from the rod end of the table cylinder 46, the fluid which is returned from the table cylinder being conducted to the valve 94 and thence through a return pipe 99 back to the reservoir.

Valve 95, controlling the right hand table, is connected by means of a pipe 55' and an annular passage 97' to the rod end of the work table cylinder 46', while a pipe 54' conducts fluid from the valve through the piston 49' to and from the head end of the work table cylinder. The fluid returned from the cylinder 46' to the valve 95 is discharged to the reservoir 71 through a return pipe 104. A pressure relief valve 106 is connected in the pressure line 91 so that when the pressure in the line exceeds a certain amount excess fluid can be returned through a pipe 107 to the reservoir 71.

In order that the valves 94 and 95 may be shifted under electrical control, each is provided with suitable solenoids. In the present instance solenoids O and P of the pull type are associated respectively with opposite ends of the core of valve 94 and are so arranged that energization of the solenoid O shifts the valve to direct fluid to the head end of the cylinder 46 to advance the table 41, while energization of the solenoid P shifts the valve to direct fluid to the rod end of cylinder 46 to retract the table. Similarly, valve 95 is provided with solenoids M and N operating in the same manner upon the valve 95.

It will be apparent then that in a machine provided with two separate and distinct hydraulic circuits, one a high pressure circuit for driving the broaching ram with great force, and the other a comparatively low pressure circuit for shifting the work supporting tables from one position to another, a well organized control system becomes necessary. Such a system has been provided herein and, as previously stated, is electrical in character. Like the hydraulic system, the electrical control system is composed of a high voltage circuit for controlling the solenoids A and B of the high pressure ram circuit and a low voltage circuit for controlling the solenoids M, N, O and P of the low pressure table circuit. These circuits are shown in Fig. 5.

In addition to the solenoids mentioned, the circuits comprising the electrical control system include a plurality of relays RA, RB, RC, RD and RS, a plurality of table or ram actuated switch devices, and a plurality of manual push button switches. Of the relays, RA and RB control respectively switches C—A and C—B which are open when the relays are deenergized and closed upon energization of the relays. As their designation suggests, these switches and relays are associated with the solenoids A and B. The relay RC controls a plurality of switches C—C$^1$, C—C$^2$, C—C$^3$ and C—C$^4$. Of these switches, C—C$^1$ and C—C$^2$ are open when the relay RC is deenergized, while C—C$^3$ and C—C$^4$ are closed, the reverse being true when the relay is energized. Similarly, the relay RD controls four switches C—D$^1$, C—D$^2$, C—D$^3$ and C—D$^4$. Of these switches, C—D$^1$ and C—D$^3$ are normally open when the relay is deenergized, while C—D$^2$ and C—D$^4$ are normally closed, the reverse being true when the relay is energized. The relays RC and RD and the switches controlled thereby are associated with the solenoids M, N, O and P. Relay RS, which is the main starting relay, controls switches C—S$^1$ and C—S$^2$, both closed when the relay is energized and open when the relay is deenergized.

The table and ram actuated switch devices comprise switch devices TS—1 and TS—2 actuated by the table 42, switch devices TS—3 and TS—4 actuated by the table 41, and switch devices actuated by the ram and in Fig. 6 shown as separate devices designated RS—U and RS—L. The switch devices may be simple devices, that is, composed of but a single switch, or compound devices, that is, composed of a plurality of switches. Preferably the switches of the switch devices are suitably enclosed to protect the same. By way of example, the switch devices TS—1 and TS—2 for the table 42 (see Fig. 3) are shown encased in housings 56 and 57 respectively. Projecting upwardly from the housing 56 is an actuator 58 and projecting upwardly from the housing 57 is an actuator 59. Carried respectively by the actuators 58 and 59 are rollers 60 and 61 to be engaged by a suitable cam carried by the table. Each switch device has what may be termed an actuated position, which is assumed when the cam engages the roller, and a normal or free position which is assumed when the cam no longer is in engagement with the roller.

As best seen in Figs. 5 and 6, the switch device TS—1 is a compound device having switches TS—1$^1$ and TS—1$^2$. This switch device is shifted to its actuated position by a cam D1 carried by the table 42 when the latter is in its loading position. In that position of the switch device TS—1, the switch TS—1$^1$ is closed while the switch TS—1$^2$ is open. The switch device TS—2 is a simple device having but a single switch TS—2 which is open when the switch device is in its normal or free position. This device is so disposed as to be actuated by the cam D1 of the table 42 when the table is in its inner or broaching position.

Switch devices TS—3 and TS—4 are duplicates, respectively, of switch devices TS—1 and TS—2, TS—3 being a compound device having switches TS—3$^1$ and TS—3$^2$, and TS—4 being a simple switch device having but a single switch TS—4. Switch device TS—3 is actuated by a cam D2 carried by the table 41 when in its loading position, and in that condition of the switch device the switch TS—3$^1$ is closed while the switch TS—3$^2$ is open. Switch device TS—4 is actuated when the table 41 is in its inner or broaching position and the switch TS—4 thereof is normally open when the device is in its normal or free position.

The switch devices RS—U and RS—L are both simple devices having but a single switch carrying the same designation. These switch devices are actuated by a cam D3 carried by the ram, the device RS—U being actuated when the ram is in its initial or withdrawn position and the device RS—L being actuated when the ram is in its lower or shifted position. It is material to proper operation of the device that the switch RS—U be closed when actuated by the cam, and that the switch RS—L be opened when actuated by the cam since, in the normal position of the ram shown in Figs. 5 and 6 wherein the cam is in contact with switch RS—U only, both switches are closed.

Having described the relays, the switch devices and the switches actuated thereby, the connection thereof in the electrical control system will now be described, reference being had particularly to Fig. 5. As previously stated, the system comprises a high voltage circuit which includes the solenoids A and B for shifting the four-way valve 73 in the high pressure ram circuit. Herein the solenoids A and B are connected in parallel between main line wires L1 and L2, and connected in series respectively with the solenoids A and B are the relay controlled switches C—A and C—B. Also connected between the line wires L1 and L2 in parallel with the solenoids A and B is a primary winding of a transformer T. Connected in the line wire L2 ahead of the solenoids and the transformer winding is a manually actuated switch 110 serving as a main or master switch controlling the entire electrical system.

The low voltage circuit, which includes the solenoids for the valves 94 and 95 as well as all the relays and the switch devices actuated by the ram and the work supporting tables, derives its energy from the high voltage circuit and to that end the secondary winding of the transformer T is connected at its ends to wires L3 and L4. Connected across the wires L3 and L4 is the relay RS, and connected in series therewith is a normally open push button switch 111 and a normally closed push button switch 112. Of these, the switch 111 is a starting switch which is depressed to energize the starting relay RS, while switch 112 is a stop switch which is depressed when it is desired to deenergize the starting relay RS manually. As previously stated, the relay RS controls two switches C—S$^1$ and C—S$^2$. The latter of these switches C—S$^2$ is connected around the normally open switch 111 so as to form a holding circuit for the relay RS once the switch 111 has been momentarily closed. The switch C—S$^1$ is disposed in the wire L3 to control the flow of current to all of the remaining switches, solenoids and relays in the remainder of the low voltage circuit.

The relays RC and RD, which as previously stated are associated with the solenoids for the control of the four-way valves 94 and 95 in the low pressure hydraulic circuit, are connected in parallel between the wires L3 and L4 through the switch RS—L forming a common series connection. Also is series respectively with the relay RC and the relay RD are the switches C—C$^1$ and C—D$^1$ controlled by the relays and thus in effect constituting holding switches. Connected in duplicate shunt circuits around the switches C—C$^1$ and C—D$^1$ are push button switches 62 and 63 for initiating inward movement of the tables 41 and 42, respectively. These switches are so arranged that when both switches are in their normal position both shunt circuits will be broken, but with either switch depressed one of the shunt circuits will be closed to energize a corresponding relay and thereby initiate forward movement of the appropriate table.

Also connected between the wires L3 and L4 through the switch RS—L is the relay RB, but interposed between the relay and the switch RS—L are switches TS—2 and TS—4 connected in parallel. The relay RA is connected between the wires L3 and L4 through the switches TS—3$^1$ and TS—1$^1$. The solenoids M, N, O and P for actuating the valves 94 and 95 are connected in parallel between the wires L3 and L4. In common series with the solenoids M and O is the switch RS—U, and respectively in series with the solenoid M and the solenoid O are the switches C—D$^2$ and C—C$^2$ and switches C—C$^4$ and C—D$^3$. The solenoid N has in series therewith the switch C—C$^3$ and the switch TS—1$^2$, while the solenoid P has in series therewith the switch C—D$^4$ and the switch TS—3$^2$.

The operation and the function of the various elements of the electrical circuit control system, as well as the function of the valves, is best understood from a consideration of the operation of the broaching machine. For that purpose let it be assumed that the ram and the tables are in their retracted position as shown in Fig. 6 and that the various switch devices actuated by the ram or the tables are in corresponding positions which are the positions shown in Fig. 5. Let it be assumed further that the means for driving the pumps PR and PT has been set in operation, for example, by depressing a push button switch 34 mounted on the side of the broaching machine (see Fig. 1) and that the main switch 110 has been closed and that the starting switch 111 has also been momentarily depressed. It will readily be understood that momentary depression of the starting switch 111 completes a circuit through the relay RS, thereby energizing the same and causing the switches C—S¹ and C—S² controlled thereby to be closed, thereby establishing a holding circuit for the relay RS and completing the circuit to the wire L3.

The electrical control system is now in the condition shown in Fig. 5 and it is to be noted that the switches TS—3¹ and TS—1¹ are closed so that relay RA is energized, with the result that the solenoid A is energized thereby shifting the valve 73 to cause pressure fluid to be supplied to the rod end of the cylinder 13 for raising the ram. Since the ram already is in its uppermost position, the pressure of the fluid serves merely to retain the ram in that position with the excessive fluid supplied by the pump PR returned to the reservoir 71 through the valve 75. It is also to be noted that the relays RB, RC and RD and the solenoids M, N, O and P are all deenergized. The valves 94 and 95 are in such position, respectively, that the tables are held in retracted position and that the excess fluid from the pump PT is being returned to the reservoir through the valve 106 and pipe 107.

Let us assume that the right hand work supporting table has been loaded with a work piece all ready to be broached. The first operation, therefore, is to advance the right hand work supporting table to a broaching position. This is accomplished by manually pushing the right hand table feed push button 63 inward so that it closes the circuit through the relay RC which after energization is held energized by a holding circuit completed through switch C—C¹. The energization of relay RC shifts all the switches connected therewith, identified as C—C, to a position opposite to that shown in Fig. 5, so that C—C¹ and C—C² become closed while C—C³ and C—C⁴ are opened. Thus, in addition to completing a holding circuit for the relay RC, the circuit through the solenoid M is completed due to the fact that the switch C—D² and the switch RS—U were already closed. By energizing the solenoid M, the valve 95 is shifted in such a manner that hydraulic fluid is fed to the head end of the work table cylinder 46' and thereby advances the work supporting table 42 to a broaching position.

As an incident to the advance of table 42, the cam D1 releases the multiple switch device TS—1 as the table leaves the loading position and actuates the simple switch device TS—2 when it reaches a broaching position. Release of the switch device TS—1 causes switch TS—1¹ to open, thereby breaking the circuit through the relay RA with the resultant deenergization of the solenoid A. Release of the switch device TS—1 also causes switch TS—1² to close, but this has no effect upon the solenoid N because the switch C—C³ is now open. Actuation of the switch device TS—2 when the table reaches a broaching position causes the switch TS—2 to close, thereby completing the circuit through the relay RB since the switch RS—L is already closed. Energization of the relay RB by closure of switches C—B causes energization of the solenoid B which is now free to shift the four-way valve 73 in the opposite direction, the solenoid A being deenergized, so that hydraulic fluid is fed to the head end of the cylinder 13 advancing the ram through a broaching stroke.

Movement of the ram downward through a broaching stroke is effective through the cam D3 to reverse the positions of the upper and lower ram switches RS—U and RS—L so that, when the ram has reached the end of its broaching stroke, both of these switches are open. It will be noted that the opening of the switch RS—L breaks the circuit through relays RC and RB, deenergizing them, so that the solenoid B no longer shifts the valve 73 to effect a downward stroke of the ram and the deenergization of RC effects a reversal of the position of the switches C—C so that they are again in the positions occupied originally, i. e., the positions shown in Fig. 5.

At this juncture, the work piece has been broached and it becomes necessary to withdraw the work piece before the return of the ram to its initial position. Withdrawal is accomplished automatically by reason of the fact that the switch C—C³ (previously open) has just been closed by deenergization of relay RC so that the circuit through solenoid N is completed, TS—1², of course, having been previously closed by movement of cam D1. The solenoid N, being energized, shifts the valve 95 to an opposite position whereby the direction of the hydraulic fluid is reversed, the fluid under pressure now being directed to the rod end of the cylinder 46' to retract the work supporting table. This return, it will be noted, has likewise been accomplished automatically, but when the return has been completed multiple switch device TS—1 is again actuated causing the switch TS—1² to be opened, thus breaking the circuit through the solenoid N. At the same time switch TS—1¹ is closed, thereby completing the circuit through relay RA energizing that relay so that it closes the switch C—A in the ram circuit, which in turn allows the solenoid A to become energized and shift the four-way valve 73 to effect automatically an upward or return stroke of the broaching ram to an initial position. At this stage of the cycle all of the parts come to rest in the positions indicated at the start of the operation just described. It should be noted, however, that as an incident to such return movement of the ram both the switches RS—L and RS—U are again closed. This conditions the circuit including the relays RC and RD for completion by depression of one of the buttons 62 or 63 and also conditions the circuit including the table "in" solenoids M and O.

While the work piece on the right hand work supporting table is being broached, another work piece is loaded on the left hand work supporting table. That piece is now ready for a broaching operation so that we are prepared to have the left hand work supporting table advance to a broaching position while the right hand table remains fixed. To accomplish this, the left hand table feed switch 62 is pushed inward, completing the circuit through relay RD. The operation then is identical with that described for the right hand table except that the switches C—D and TS—3 and TS—4 and solenoids O and P are involved. Briefly, the operation is as follows: The energization of relay RD reverses all of the switches C—D from the positions originally occupied, thereby establishing a holding circuit by closing the switch C—D¹ and completing a circuit through the solenoid O (since RS—U has been closed) by closing switch C—D³. As a result, the valve 94 is shifted to a position where fluid under hydraulic pressure is fed to the head end of the table cylinder 46, serving to advance the table to a broaching position.

As the left hand table begins its advance, multiple switch device TS—3 is shifted opening TS—3¹ to deenergize RA and closing TS—3², but solenoid P is not energized because C—D⁴ is open. As soon as the advance is completed, device TS—4 is shifted, effecting a closure of the switch TS—4 thereby completing the circuit through the relay RB. With this circuit completed, RB is energized which in turn closes the switches C—B in the primary circuit, thereby energizing the solenoid B which immediately shifts the four-way valve in such a position that the broaching ram is advanced through a broaching stroke. Again, as previously described, as soon as the ram has completed its broaching stroke, the ram switches RS—U and RS—L are reversed (opened) preparatory to retracting the left hand table to a loading position before return of the broaching ram. The retraction is accomplished by the closure of switch C—D⁴ when the relay RD is deenergized, thus completing the circuit through solenoid P and the closed switch TS—3². Energizing the solenoid P serves to shift the valve 94 so that the hydraulic circuit is reversed in order to feed fluid to the rod end of the cylinder 46 to retract the attached work supporting table to a loading position. As soon as this position has been reached, the multiple switch device TS—3 and switch TS—4 will have been shifted again to their original positions, i. e., that shown in Fig. 5, whereupon TS—3¹ will be closed completing the circuit through relay RA which serves, as previously described, to energize the solenoid A in order to then retract the broaching ram to its initial upward position. At the same time, element TS—3² has been opened, breaking the circuit through the solenoid P which ceases to shift the valve 94 in a position wherein the work supporting table 41 is urged toward the left. Again all of the mechanical parts come to a position at rest, as indicated previously, before the start of each cycle of operation.

Upon an inspection of the circuit, it will be noted that certain safety features are present, namely, that when one work supporting table is in operation, pushing the start button for the other table will have no effect upon the latter table but may only halt operation of the table already in motion. Similarly, if both tables are out and the ram is away from its initial position, neither table can be moved into a broaching position until the ram has returned to its initial position, because of opened switches in the circuit.

In the manner described, each work supporting table may be actuated independently whenever it is completely loaded with a work piece and ready for a broaching operation. As soon as one or the other of the tables has been started in its cycle of movement, the broaching stroke of the ram, the return stroke of the work supporting table, and the return stroke of the ram are all accomplished automatically. Although there is an automatic connection individually between each of the tables and the single broaching ram, there is no automatic control between the tables themselves, each being especially designed for reasons of economy and safety to operate independently one from the other.

While for simplicity in disclosure the cams D1, D2 and D3 in the diagrammatic Fig. 6 are shown as single cams, they are actually composed of separate parts in order that the spacing thereof may be varied to vary the length of stroke of the work supporting tables or of the broach supporting ram. As best seen in Fig. 3, the cam D1 is composed of two parts, D1' and D1'', as is also the cam D2 (not shown in Fig. 3). Similarly, as best seen in Fig. 2, the cam D3 is composed of two parts D3' and D3''. The switches RS—U and RS—L are of conventional construction and may be mounted at any appropriate place on the machine. Herein they are shown mounted on the side of the column instead of the broaching machine.

I claim as my invention:

1. A broaching machine comprising, in combination, a single reciprocal broach-carrying ram having a plurality of broach supports thereon, a plurality of reciprocal work supporting tables movable in a substantially common plane transverse to the line of movement of said ram, each having a loading and a broaching position and each being cooperable with certain of the broach supports, hydraulic means for driving said ram repeatedly through a cycle including a broaching stroke and a return stroke of substantially equal length and for driving said tables through a cycle including an advancing and a return movement, and electrical control means governing said hydraulic means to operate the tables through a cycle of operation during alternate cycles of operation of said ram.

2. A broaching machine comprising, in combination, a single reciprocal broach-carrying ram having broach supporting means thereon, a plurality of reciprocal work supporting tables movable in a substantially common plane transverse to the line of movement of said ram, each having a loading and a broaching position and each being cooperable in the broaching position with the ram, hydraulic means for driving said ram repeatedly through a cycle including a broaching stroke and a return stroke of substantially equal length and for driving said tables through a cycle including an advancing and a return movement, and electrical means for controlling said hydraulic means including manual means for initiating the cycle of movement of said work supporting tables, and automatically actuated means for controlling the cycle of movement of the tables after initiation, and the cycle of movement of the broach-carrying ram.

3. A broaching machine comprising, in combination, a single reciprocal broach-carrying ram provided with broach supports, a plurality of reciprocal work supporting tables each having a loading and a broaching position, hydraulic means for reciprocating the ram and the tables including a high pressure circuit for driving the ram through a cycle of movement including a broaching stroke and a return stroke, and a low pressure circuit for driving each table through a cycle including an advancing movement and a return movement, and electrical control means for the hydraulic means including a high voltage circuit for governing the flow of fluid in the high pressure hydraulic circuit, a low voltage circuit for controlling the flow of fluid in the low pressure hydraulic circuit, manual means for initiating a cycle of operation of either one of the tables, and means actuated as an incident to movement of said tables or said ram for controlling the remainder of the cycle of the table and the cycle of the ram and for coordinating the movements of the ram and the table composing those cycles.

4. In a broaching machine, a broach-carrying ram provided with sets of broach supports for holding each a pair of parallel opposed surface broaches all arranged to cut when moving in a common direction, a plurality of independently operable work supporting tables movable in a substantially common plane transverse to the line of movement of the ram and at a right angle thereto having a projecting portion thereof extendible between the faces of the parallel broaches and each cooperable with one of said sets of broaches, means for moving each respective table to and from a broaching position, and means for advancing the ram through a broaching operation and retracting it therefrom.

5. In a vertical broaching machine, a vertical reciprocating ram provided with sets of broach supports in the same vertical plane for holding each a pair of parallel opposed surface broaches all arranged to cut when moved in a common direction, a plurality of independently operable work supporting tables reciprocable in a horizontal plane at right angles to the plane of the broach supports each cooperable respectively with one of said pair of broaches, means for moving each respective table to and from a broaching position, and means for advancing the ram through a broaching operation and for retracting it therefrom.

6. In a broaching machine, a frame, a broach-carrying ram mounted thereon provided with broach supports, electrically actuated means for directing operation of the ram, a work supporting table mounted on the frame, electrically actuated means for directing operation of the table, a manually actuated switch for initiating operation to move said table to a broaching position, automatic switch means cooperable with the ram for initiating a broaching stroke thereof and for returning said ram to a starting position, and automatic switch means for returning the work table to an initial position before return of the ram to a starting position.

7. In a broaching machine, a frame and a broach-carrying ram mounted thereon provided with two sets of broach supports and electrically actuated means for directing operation of the ram, a pair of alternately operable work supporting tables mounted on the frame each cooperable respectively with one of the sets of broach supports and electrically actuated means for directing the operation of the tables, a switch means for each table for causing said table to move to a broaching position, and other switch means for causing said ram to move through a broaching stroke and for causing said ram to return to a starting position.

8. In a broaching machine, a frame, a broach-carrying ram mounted thereon provided with two sets of broach supports, electrically actuated means for directing operation of the ram, a pair of alternately operable work supporting tables mounted on the frame cooperable respectively with one of the sets of broach supports, electrically actuated means for directing the operation of each table, a manually actuated switch for causing each of said tables to move to a broaching position, and dog operated switch means effective to initiate a broaching stroke of the ram and to return said ram to a starting position, there being a dog operated switch means on the ram for automatically effecting the return of each respective work table to an initial position before return of the ram to an initial position.

9. In a hydraulic broaching machine, a frame, a hydraulic circuit provided with solenoid operated valves and a hydraulic broach-carrying ram mounted on the frame having broach supports, a hydraulically actuated work table mounted on the frame cooperable with the broach supports and a hydraulic circuit for driving the work table controlled by solenoid operated valves, a manually actuated switch means for initiating operation to move said table to a broaching position, and automatic switch means cooperable with the solenoid operated valves of the ram circuit for initiating a broaching stroke of the ram and for automatically returning said ram to a starting position, said ram being provided with automatic switch means cooperable with the solenoid operated table circuit valves for automatically returning the work table to an initial position.

10. In a hydraulic broaching machine, a frame, a hydraulic broach-carrying ram mounted thereon having two sets of broach supports, a hydraulic circuit provided with solenoid operated valves, a pair of alternately operable hydraulically actuated work tables mounted on the frame each cooperable respectively with one of the sets of broach supports, a hydraulic circuit for the work tables controlled by solenoid operated valves, a manually actuated switch means on each of the tables for initiating movement of said table to a broaching position and automatic switch means cooperable with the solenoid operated valves in the ram circuit for initiating a broaching stroke thereof and for automatically returning said ram to a starting position, there being provided an automatic switch means for the ram cooperable with the solenoids of the work table valves for returning each respective work table to an initial position.

11. In an electrically controlled broaching machine, a work table, a broaching ram having means for supporting a broach thereon, an electric control system for the ram and another electric control system for the table, an independent manually actuated starting switch for said table and automatic means carried on the table for alternately shifting the ram control system so as to advance the ram when the work table is in a broaching position and retract the ram to an initial position after the work table is returned to an initial position, and automatic means carried by the ram for shifting the table control system after a broaching stroke to return the table to its initial position before return of the ram to the initial position thereof.

12. In an electrically controlled broaching machine, a battery of work tables and a single broaching ram, means on the ram for supporting individual broaches thereon cooperable one with each of the work tables comprising the battery, and an electric control system for actuating each of the tables, there being an independent manually actuated starting switch in the system for each table and automatic means actuated by the table for alternately shifting the ram control system so as to advance the ram when an operative work table is in a broaching position and retract the ram when said work table is in an initial position, and a set of automatic means actuated by the ram for shifting the control system for each respective table after a broaching stroke to return an operative table to its initial position.

13. In an electrically controlled broaching machine, a pair of work tables and a single broaching ram, individual broaches on said ram each cooperable independently with one of the pair of work tables, a primary electric circuit for actuating the ram controls, an independent manually actuated starting switch for each table in the electric table circuit and automatic means actuated by the table for alternately shifting the electric ram control circuit so as to advance the ram when an operative work table is in a broaching position and retract the ram after said operative work table has been returned to a loading position, and a single set of automatic means actuated by the ram cooperable with both tables for successively shifting the table control circuit after a broaching stroke to return the operative table to a loading position before return of the ram to an initial position.

14. An electro-hydraulic broaching machine comprising a hydraulically actuated broach-carrying ram provided with broach supporting means and a hydraulically actuated work table cooperable with the broach supporting means, a hydraulic circuit for the ram and a hydraulic circuit for the work table, an electric control system for the ram and an electric control system for the table, electrically actuated means under the control of said table and cooperable with the ram circuit for advancing and retracting the ram, electrically actuated means under the control of said ram and cooperable with the table circuit for automatically returning said table to an initial position after a broaching stroke operative thereon, and a manually actuated switch for initiating operation of the table.

15. An electro-hydraulic broaching machine comprising a hydraulically actuated broach-carrying ram provided with sets of broach supports and a plurality of hydraulically actuated work tables each cooperable respectively with one of the sets of broach supports, a hydraulic circuit for the ram and a hydraulic circuit for the work tables, an electric control system for the ram circuit and an electric control system for the table circuit, electrically actuated means cooperable with the table circuit and under the control of the ram for automatically returning each table to an initial position, and a manually actuated switch cooperable with each table for independently initiating separate operation of each said table.

16. A broaching machine comprising, in combination, a frame, a broach-carrying ram reciprocably mounted on said frame for movement through a broaching and a return stroke, a plurality of work supporting tables reciprocably mounted on said frame for movement from a loading to a broaching position and return, hydraulic means for reciprocating said ram and said tables comprising a high pressure ram circuit including a hydraulic motor for driving the ram, a pump for supplying hydraulic fluid under pressure and a solenoid actuated valve for directing the fluid to the ram motor alternately in opposite directions to effect a broaching and a return stroke thereof, and a low pressure table circuit comprising a hydraulic motor for each table, a pump for supplying operating fluid and a solenoid actuated valve for each table motor operable to direct fluid to the motor in alternate directions to effect movement from loading to broaching position and return, and an electrical control system for the hydraulic means comprising a high voltage circuit including the solenoids for the valve of the ram circuit and a low voltage circuit including the solenoids for the valves of the table circuit, manually actuated switches for selectively initiating movement of the work supporting tables, and automatically actuated switches for controlling the movement of the ram and of the remainder of the table cycle.

17. A broaching machine comprising, in combination, a frame, a broach-carrying ram reciprocably mounted on said frame for movement through a broaching and a return stroke, a plurality of work supporting tables reciprocably mounted on said frame for movement from a loading to a broaching position and return, hydraulic means for reciprocating said ram and said tables comprising a high pressure ram circuit including a hydraulic motor for driving the ram, a pump for supplying hydraulic fluid under pressure and a solenoid actuated valve for directing the fluid to the ram motor alternately in opposite directions to effect a broaching and a return stroke thereof, and a low pressure table circuit comprising a hydraulic motor for each table, a pump for supplying operating fluid and a solenoid actuated valve for each table motor operable to direct fluid to the motor in alternate directions to effect movement from loading to broaching position and return, and an electrical control system for the hydraulic means including the solenoids for the valves in the hydraulic circuits, a manually operable push button switch for each table selectively operable to initiate movement of the tables from loading to broaching position, a first automatic switch device for each table actuated as an incident to movement of the table to broaching position to initiate a broaching stroke of said ram, a second automatic switch device actuated as an incident to a completion of the broaching stroke of the ram operable to effect return movement of whichever table is in broaching position, a third automatic switch device actuated as an incident to return of the table to loading position operable to effect return movement of said ram, and a fourth automatic switch device actuated as an incident to return of said ram to initial position operable to recondition the circuit for initiation of a table movement by operation of one of the manually actuated push button switches.

18. In a broaching machine, in combination, a frame, a broach-carrying ram reciprocably mounted on said frame and provided with a plurality of supports for broaches arranged to cut in a common direction, a plurality of alternately operable work supporting tables reciprocably mounted on said frame for movement in a substantially common plane at substantially right angles to the plane of reciprocation of said ram and arranged to support work pieces facing in a common direction, each of said tables having a loading and a broaching position, means for advancing said tables to broaching position alternately and independently of each other prior to a broaching operation on the work carried thereon and for withdrawing the advanced table upon the completion of the broaching operation, and means for moving the ram in said common direction past the work tables through a broaching stroke after each table is advanced and for returning it through a non-broaching stroke of equal length after each table is withdrawn.

19. In a broaching machine, a frame, a broach-carrying ram reciprocably mounted thereon and provided with supporting means for a plurality of broaches arranged to cut in a common direction, a plurality of work supporting tables mounted on the frame in a substantially common plane at right angles to the plane of movement of said ram and each arranged to support a work piece for presentation to a corresponding broach, each having a loading position remote from and a broaching position adjacent to the path of the corresponding broach, power means for repeatedly reciprocating the ram through forward broaching and non-broaching return strokes of constant length and for reciprocating the tables, manually actuated means effective on the power means for separately initiating operation of each of the tables to advance each table to broaching position, and automatic means cooperable with each of said tables effective on the power means to produce a separate broaching stroke for the ram after an advance movement of each of said tables and, after withdrawal of each table, to return said ram to a starting position, said ram being provided with means for automatically effecting the return of each respective work table to its loading position.

20. In a broaching machine, a frame and a broach-carrying ram mounted thereon for vertical reciprocation and provided with two sets of supports for broaches arranged to cut in a downward direction, a pair of independently and alternately operable work supporting tables mounted on the frame for movement in a substantially common plane and each cooperable with one of the sets of broach supports, power means for reciprocating said ram through a stroke of constant length and for reciprocating said tables, manually actuated means for effecting movement of said tables, alternately, to a broaching position, automatic means cooperable with the ram for effecting a downward broaching stroke thereof when a table has been moved to broaching position and for returning said ram to a starting position after such table has been withdrawn, and means on the ram for automatically initiating the return of each respective work table to its withdrawn position before return of the ram to its starting position.

FRANCIS J. LAPOINTE.